March 17, 1970  M. J. OLIVER  3,500,786
MARINE ENGINE COOLING ADAPTER
Filed April 8, 1968  2 Sheets-Sheet 1
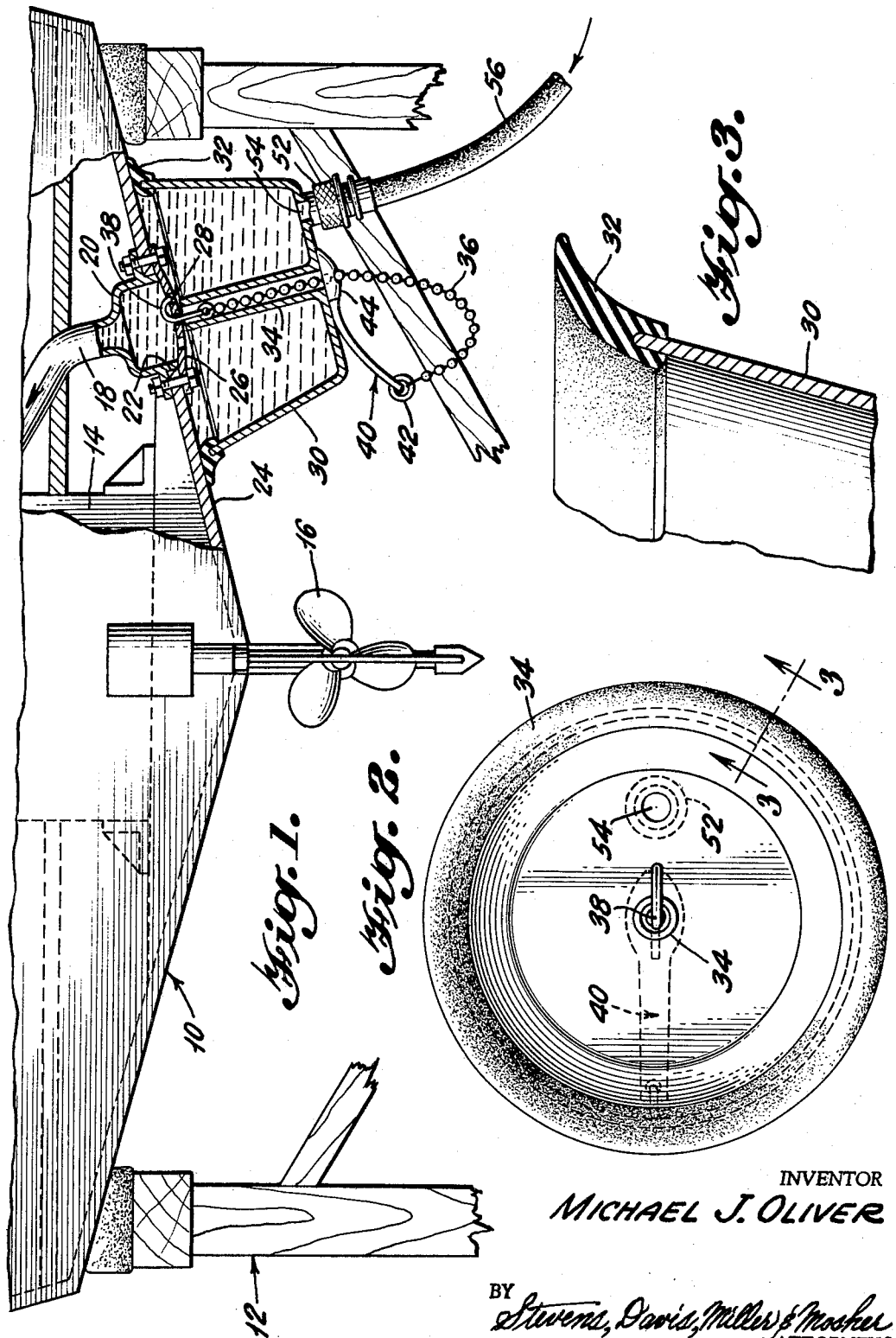
INVENTOR
MICHAEL J. OLIVER
BY
Stevens, Davis, Miller & Mosher
ATTORNEYS March 17, 1970     M. J. OLIVER     3,500,786
MARINE ENGINE COOLING ADAPTER
Filed April 8, 1968     2 Sheets-Sheet 2
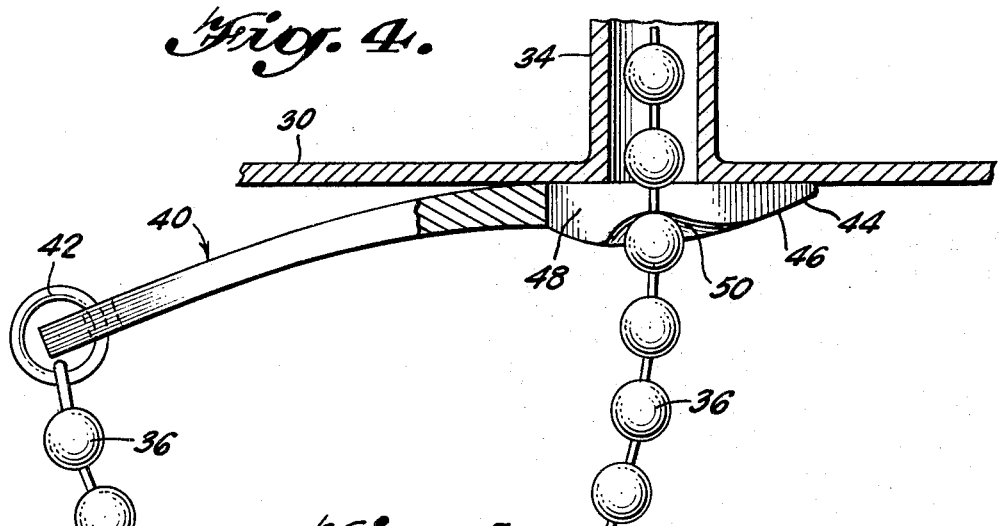
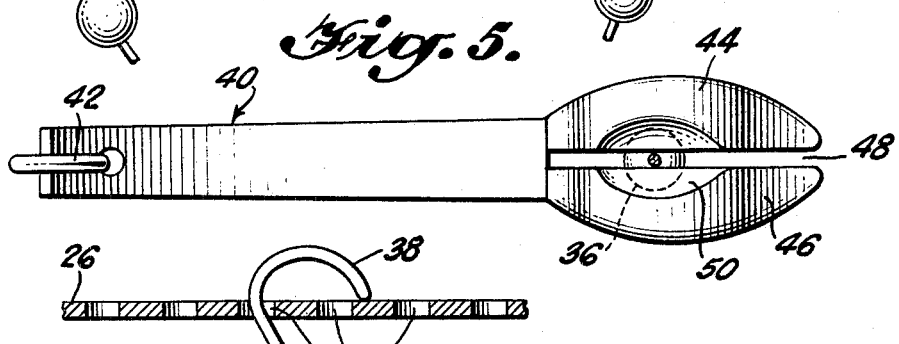
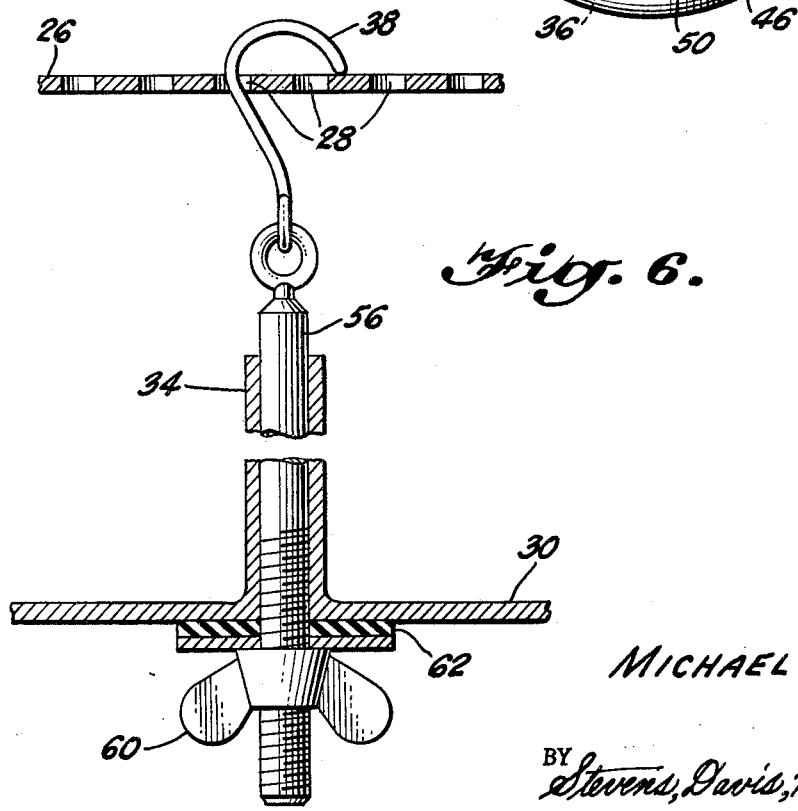
INVENTOR
MICHAEL J. OLIVER
BY Stevens, Davis, Miller & Mosher
ATTORNEYS

United States Patent Office 3,500,786
Patented Mar. 17, 1970

---

3,500,786
MARINE ENGINE COOLING ADAPTER
Michael J. Oliver, 19741 NW. 7th Court,
Miami, Fla. 33169
Filed Apr. 8, 1968, Ser. No. 719,421
Int. Cl. B63b *35/00;* F16l *5/00, 41/00*
U.S. Cl. 115—.5                                       4 Claims

ABSTRACT OF THE DISCLOSURE

A marine engine cooling adapter for insertion over a grill strainer provided in the hull of a marine craft, the adapter including a cup-shaped member, the open end of which is adapted to fit against said hull and surround the grill strainer. Means are also provided to secure the cup-shaped member against the hull and to connect the cup-shaped member to a source of water.

---

This invention relates to an apparatus for cooling the engine of a marine craft and, more particularly, to a device for coupling a water cooled marine engine to a water supply when the marine craft is out of water.

In inboard-outboard motors and plain inboard motors of marine craft, the water which supports the craft is generally utilized to cool the engine during its operation. This is normally accomplished by pumping the water into the engine through a grill strainer, or the like, mounted on the hull of the craft.

When the craft is not in a body of water, it is apparent that some other means must be provided for introducing water into the engine before it can be operated. This is particularly important when the engine must be operated on dry land for the purposes of engine tuning, making engine adjustments, or repair.

It has been proposed to effect the above by mechanically disassembling the water feed lines of the engine and reconnecting them directly to a source of water, or, of course, to return the craft to the body of water during the tune-up, adjustment, or repair. However, it is clear that both of these proposals are difficult and time consuming.

It is therefore an object of the present invention to provide a device for introducing water to a water cooled engine mounted in a marine craft without requiring mechanical alteration of the engine assembly, and without immersing the hull of the craft in a body of water.

Briefly summarized the present invention features the use of a cup-shaped member of pot, the open end of which is adapted to fit against the hull of the craft and over the grill strainer, a connector being provided on the cup-shaped member for connection with a standard conduit, such as a hose, for feeding water through the cup-shaped member and strainer into the engine. Means are provided which attach to the grill strainer and secure the cup-shaped member to the hull in a sealing manner.

Reference is now made to the accompanying drawings for a better understanding of the nature and objects of the present invention, which drawings illustrate the best mode presenting contemplated for carrying out the objects of the invention and its principles, and are not to be construed as restrictions or limitations on its scope. In the drawings:

FIG. 1 is an end elevational view paritally in section depicting the apparatus of the present invention shown in an operative condition fastened to the hull of a marine craft;

FIG. 2 is a top plan view depicting the cup-shaped member and its associated components, mounted on the hull of the craft;

FIG. 3 is a transvere sectional view taken along line 3—3 of FIG. 2;

FIG. 4 is a partial cross-sectional view showing the function of the keeper member of the present invention;

FIG. 5 is a bottom plan view of the keeper member of the present invention; and

FIG. 6 is a cross-sectional view showing an alternate device for retaining the cup-shaped member on the hull of the craft.

Referring specifically to FIGS. 1 and 2, the reference numeral 10 refers to the hull of a marine craft being supported on dry land by means of a stand, support blocks, or trailer, generally shown at 12. A water cooled engine 14 is mounted within the hull and drives a propeller mechanism 16 extending outwardly from the hull. A generally known water inlet pipe 18 is provided which is connected at one end to the engine in any known manner, and which has an enlarged inlet bell 20 formed at the other end thereof, which bell extends through an inlet opening 22 formed in the bottom 24 of the hull 10.

A grill strainer 26 is secured to the bottom 24 of hull 10, extends over opening 22 and inlet bell 20, and is secured to the bottom of the hull by means of the nut-bolt arrangement, as shown. The grill strainer has a plurality of apertures 28 formed therein.

The present invention features the use of a cup-shaped member 30 which extends over grill strainer 26 and engages the bottom 24 of the hull 10 by means of a resilient gasket 32, the latter being shown better in FIG. 3. A tube 34 extends within the cup-shaped member 30 from approximately the central portion of the bottom thereof to the proximity of grill strainer 26. A bead chain 36 is provided which extends through tube 34 and is connected at one end to a hook 38 which, in turn, is adapted to extend through apertures 28 located in the general central portion of the grill strainer 26 to secure the chain with respect to the latter.

A keeper member 40 is fixed to the other end of the chain 36 by means of a ring connector 42, the keeper member being better shown with reference to FIGS. 4 and 5.

As shown, the keeper member has a head portion 44 provided with an inclined surface 46 and a slot 48 terminating in an enlarged cavity 50.

Referring again to FIG. 1, a connector 52 is provided on the bottom portion of cup-shaped member 30 surrounding an inlet opening 54 formed in the latter, the connector being adapted for connection to any standard size hose 56, as shown.

In operation, the hook 38 is attached through a pair of generally centrally located apertures 28 formed in the grill strainer 26, and the cup-shaped member 30 is placed over the grill strainer 26 with the gasket 32 engaging the hull 10. The chain 36 is then pulled taut and the keeper member 40 is inserted between two beads of chain 36 by moving the keeper member from left to right, as shown in FIG. 4. In this manner the inclined surface 46 of head 44 cams the nearest lower bead of chain 36 downwardly to put a tension on the chain. The chain is held resiliently by the partial compression of gasket 32 or by a spring inserted in the chain 36 near hook 38. The link connecting the two beads through which the head 44 of keeper 40 extends passes through slot 48 and into the enlarged cavity 50 and the bottom portion of the latter accommodates the nearest lower bead. The above tension thus enables a seal to be established between the hull 10 and cup-shaped member 30 by the resilient gasket 32 to minimize water leakage.

Water may then be passed through the hose 54, which is connected to the cup-shaped member 30 through the connector 52 into the cup-shaped member 30, bell 20, and pipe 18 into the engine 14 for normal circulation.

An alternate means for attaching the cup-shaped member 30 to the bottom of the hull 10 is shown in FIG. 6. As in the previous embodiment, a tube 34 is formed within the cup-shaped member 30 and a hook 38 is adapted to extend through a pair of apertures 28 in the grill strainer 26. In this embodiment, a rod 56 is provided which extends through the tube 34 and is connected at one end to the hook 38. The other end of rod 56 extends outwardly through the cup-shaped member 30 and has a wing nut 60 threaded thereto, which nut is adapted to engage a resilient washer 62 formed between it and the cup-shaped member 30, as shown.

Thus in order to secure the cup-shaped member 30 to the hull of the craft, the hook 38 is positioned in apertures 28 of grill strainer 26, the cup-shaped member is placed over the grill strainer 26 and positioned so that threaded rod 56 extends through tube 34 and outwardly from the cup-shaped member 30. The resilient washer 62 and wing nut are then placed over the threaded rod and the latter tightened as desired to impart the requisite compression to the resilient gasket 32 in order to sealingly secure the cup-shaped member 30 onto the hull 10.

After the cup-shaped member 30 has been secured over the hull in either of the embodiments described above, the engine can be started and water supplied through the hose and regulated so as to provide sufficient cooling. The resilient gasket 32 will relieve any excess water pressure or supply around its circumference and, by observing this condition, the water may be throttled.

Of course, after the tuning, testing, or repair of the engine, the cup-shaped member may be disconnected by simply releasing the keeper member or wing nut, and disengaging the cup-shaped member from the hull, and the hook from the grill strainer. The excess water may then be disposed of in any convenient manner.

The materials of the various components and their arrangement may be varied in accordance with this invention. For example, the cup-shaped member and tube may be either plastic or metal and the tube may be integral with, welded to, or threaded on the cup-shaped member. Also, the gasket may be of rubber or any suitable resilient material, and the hose connector may be metal or plastic and may be integral with, or detachable from, the cup-shaped member. Of course, the cup-shaped member may be of any shape, such as round, oval, rectangular, or the like. Also, any type of member similar to the bead chain may be utilized, such as a link chain, rope, or the like.

Of course other variations of the specific construction and arrangement of this type apparatus herein disclosed can be made by those skilled in the art without departing from the invention as defined in the appended claims.

What is claimed is:

1. A marine engine cooling adapter for insertion over a cooling water inlet in the hull of a marine craft, said adapter comprising a generally cup-shaped member, the open end of which is adapted to fit against said hull and surround said water inlet, an opening formed in said cup-shaped member, means adapted to connect said opening to a source of water, an attachment member adapted to attach to said water inlet, a chain member connected at one end to said attachment member, said chain member extending through said cup-shaped member and outwardly therefrom, and securing means adapted to attach to the outwardly extending portion of said chain member to fix said chain member with respect to said cup-shaped member to secure said cup-shaped member to said hull.

2. The adapter of claim 1, wherein said securing means comprises a keeper member adapted to engage a portion of said chain.

3. The adapter of claim 2, wherein said keeper member has a head portion provided with an inclined surface and a slot terminating in an enlarged cavity.

4. A marine engine cooling adapter for insertion over a cooling water inlet in the hull of a marine craft, said adapter comprising a generally cup-shaped member, the open end of which is adapted to fit against said hull and surround said water inlet, a resilient gasket around said open end, an opening formed in said cup-shaped member, means adapted to connect said opening to a source of water, a hook member adapted to attach to said water inlet, a chain connected to said hook and extending through said cup-shaped member and outwardly therefrom, and a keeper member to fix said chain with respect to said cup-shaped member to hold said cup-shaped member against said hull when said hook member is attached.

References Cited

UNITED STATES PATENTS

| | | | |
|---|---|---|---|
| 608,207 | 8/1898 | Merritt | 285—191 |
| 3,347,202 | 10/1967 | McCurry | 115—0.5 |

ANDREW H. FARRELL, Primary Examiner

U.S. Cl. X.R.

285—191